United States Patent [19]

Lai

[11] Patent Number: 5,274,008
[45] Date of Patent: Dec. 28, 1993

[54] MOLD MATERIALS FOR SILICONE CONTAINING LENS MATERIALS

[75] Inventor: Yu-Chin Lai, Pittsford, N.Y.

[73] Assignee: Bausch & Lomb Incorporated, Rochester, N.Y.

[21] Appl. No.: 3,960

[22] Filed: Jan. 14, 1993

Related U.S. Application Data

[60] Continuation of Ser. No. 795,571, Nov. 21, 1991, abandoned, which is a division of Ser. No. 618,448, Nov. 27, 1990, Pat. No. 5,158,717.

[51] Int. Cl.$^5$ .......................................... C08F 230/08
[52] U.S. Cl. .................................. 523/107; 523/106; 523/108; 523/113; 526/279; 526/245; 526/260; 526/243; 526/263; 526/247; 526/248
[58] Field of Search .................. 523/107, 106, 113; 526/279, 260, 263, 245

[56] References Cited

U.S. PATENT DOCUMENTS

| | | | |
|---|---|---|---|
| 2,976,576 | 3/1961 | Wichterle et al. | 18/58 |
| 3,220,960 | 11/1965 | Wichterle et al. | 260/2.5 |
| 3,408,429 | 10/1968 | Wichterle | 264/1 |
| 3,426,102 | 2/1969 | Solak et al. | 260/879 |
| 3,428,043 | 2/1969 | Shepherd | 125/268 |
| 3,496,254 | 2/1970 | Wichterle | 264/1 |
| 3,520,949 | 7/1970 | Shepherd et al. | 260/857 |
| 3,618,231 | 11/1971 | Nason | 35/35 |
| 3,679,504 | 7/1972 | Wichterle | 156/62 |
| 3,931,373 | 1/1976 | Beattie | 264/2.5 |
| 4,113,224 | 9/1978 | Clark et al. | 249/105 |
| 4,136,250 | 1/1979 | Mueller et al. | 528/29 |
| 4,153,641 | 5/1979 | Deichert et al. | 260/827 |
| 4,189,546 | 2/1980 | Deichert et al. | 528/26 |
| 4,197,266 | 4/1980 | Clark et al. | 264/1 |
| 4,424,328 | 1/1984 | Ellis | 526/279 |
| 4,463,149 | 7/1984 | Ellis | 526/279 |
| 4,525,563 | 6/1985 | Shibata et al. | 526/279 |
| 4,555,372 | 11/1985 | Kunzler et al. | 264/2.1 |
| 4,649,184 | 3/1987 | Yoshikawa et al. | 526/279 |
| 4,652,622 | 3/1987 | Friends et al. | 526/279 |
| 4,664,479 | 5/1987 | Hiroshi | 350/338 |
| 4,686,267 | 8/1987 | Ellis et al. | 526/245 |
| 4,690,993 | 9/1987 | Falcetta et al. | 526/242 |
| 4,711,943 | 12/1987 | Harvey | 526/279 |
| 4,740,533 | 4/1988 | Su et al. | 523/106 |
| 4,810,764 | 3/1989 | Friends et al. | 526/245 |
| 4,921,205 | 5/1990 | Drew | 249/61 |
| 5,034,461 | 6/1991 | Lai et al. | 525/100 |
| 5,070,215 | 12/1991 | Bambury | 556/418 |

OTHER PUBLICATIONS

"Acrylonitrile Polymers," Encyclopedia of Polymer Science and Engineering, 2d Ed., vol. 1, pp. 426–470 (John Wiley & Sons, N.Y., N.Y.) (1985).

J. Colloid Sci., vol. 1, p. 513 (1946), W. A. Zisman.

USSN 07/363,662 filed Jun. 7, 1989, entitled "Novel Prepolymers Useful in Biomedical Devices" by Bambury, Seelye.

*Primary Examiner*—Bernard Lipman
*Assistant Examiner*—Mark Nagumo
*Attorney, Agent, or Firm*—John E. Thomas; Craig E. Larson

[57] ABSTRACT

When molding shaped articles such as contact lenses from monomeric mixtures containing silicone monomers and hydrophilic monomers, the wettability of the resulting article is improved by using a mold material produced from a resin comprising a copolymer of an alpha, beta, olefinically unsaturated mononitrile and at least one comonomer to enhance melt processability.

19 Claims, No Drawings

MOLD MATERIALS FOR SILICONE CONTAINING LENS MATERIALS

This is a continuation of copending application Ser. No. 07/795,571 filed on Nov. 21, 1991, now abandoned which is a divisional of Ser. No. 07/618,448, filed on Nov. 27, 1990, now U.S. Pat. No. 5,158,717.

BACKGROUND OF THE INVENTION

This invention relates to the molding of shaped polymeric articles especially contact lenses. This invention more particularly relates to the molding of shaped polymeric materials from silicone-containing monomeric mixtures.

Various molding processes are known for the production of contact lenses. Among those processes are spincasting, static cast molding, and related processes. Spincasting methods are disclosed in U.S. Pat. Nos. 3,408,429 and 3,496,254. Examples of static cast molding processes are found in U.S. Pat. Nos. 4,113,224 and 4,197,266. An illustration of a related molding process is U.S. Pat. No. 4,555,372, which teaches a process comprising spincasting followed by lathe cutting.

Conventional soft contact lenses are prepared from monomeric mixtures consisting predominantly of hydrophilic monomers such as 2-hydroxyethyl methacrylate, N-vinylpyrrolidone, and others. Oxygen permeability of such conventional hydrogel materials is a result of the water content of the materials. Recently, attempts have been made to increase the oxygen permeability of soft contact lenses by the use of silicone-containing monomers. Silicone compounds are usually very hydrophobic, diminishing the wettability of silicone-containing soft lenses.

Another class of soft contact lenses—nonhydrogel soft contact lenses—are known as silicone elastomer lenses and are prepared from silicone rubbers. These lenses are highly permeable to oxygen and can easily transmit sufficient oxygen to maintain the normal respiratory process on the surface of the cornea. Unfortunately, silicone rubber is strongly hydrophobic and readily absorbs lipophilic substances which exist in the tear film. These properties result in discomfort to the lens wearer and have significantly diminished the market for this type of lens. Hydrophilic monomers have been added to silicone elastomer formulations to overcome these limitations but such attempts have not yet proven to be entirely satisfactory.

The class of contact lenses known as rigid, gas-permeable materials are also typically silicone-based copolymers prepared from siloxanylalkyl esters of methacrylic acid and other acrylate, methacrylate, or itaconate monomers in many known formulations. Such compositions, like the soft contact lens materials referenced above, exhibit enhanced oxygen permeability, due in large part to the use of silicone material. It is desirable to increase the silicone content to further enhance oxygen permeability. However, increasing silicone content diminishes wettability of the material.

SUMMARY OF THE INVENTION

It has been found that when molding shaped articles such as contact lenses from monomeric mixtures containing silicone monomers and hydrophilic monomers, the wettability of the resulting article is improved by using a mold material produced from a resin comprising a copolymer of an alpha, beta, olefinically unsaturated mononitrile and at least one comonomer to enhance melt processability.

DETAILED DESCRIPTION OF THE INVENTION

Any known contact lens material prepared from a formulation including at least one silicone monomer and at least one hydrophilic monomer may be used in the method of this invention. Included are soft contact lens formulations (both hydrogel and nonhydrogel) and rigid gas permeable contact lens formulations. While the presence of both classes of monomers is deemed necessary to secure the benefits of this invention, the particular manner in which the monomers are incorporated into the polymeric composition is not narrowly critical. For example, the monomers may have one or more polymerizable groups. They may be added to the final comonomeric mixture (from which the shaped article is cast) as monomers or as prepolymers.

Preferred soft hydrogel formulations are those described in U.S. patent application Ser. Nos. 07/363,662 filed Jun. 7, 1989 and 07/346,204, now U.S. Pat. No. 5,070,215 (issued Dec. 3, 1991), filed May 2, 1989, the entire contents filed May 2, 1989, now U.S. Pat. No. 5,034,461 (issued Jul. 23, 1991) the entire contents of which are incorporated herein by reference. Other examples of useable formulations are found in U.S. Pat. Nos. 4,136,250; 4,740,533; 4,711,943; 4,189,546; and 4,153,641.

One type of presently preferred hydrogel formulation incorporates prepolymers of the general formula:

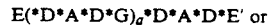

E(*D*A*D*G)$_a$*D*A*D*E' or

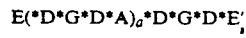

E(*D*G*D*A)$_a$*D*G*D*E', where

A denotes a divalent polymeric radical represented by the general formula chosen from the group of

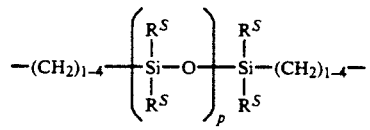

wherein

R$^S$ denotes an alkyl radical or a short chain fluorinated alkyl radical with 1 to 3 carbon atoms; and provides a moiety weight of 400 to 10,000;

D denotes an alkyl diradical, an alkyl cycloalkyl diradical, a cycloalkyl diradical, an alkylaryl diradical or an aryl diradical, with 6 to 30 carbon atoms;

G denotes an alkyl diradical, a cycloalkyl diradical, an alkyl cycloalkyl diradical, an aromatic diradical or an alkylaromatic diradical with 1 to 40 carbon atoms which may have ether, thio, or amine linkages in the main chain;

* denotes a urethane or ureido linkage; and

E and E' denote polymerizable unsaturated organic radicals represented by the general chemical formula

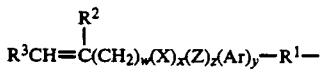

wherein
R$^1$ denotes a divalent alkylene radical with 1 to 10 carbon atoms;
R$^2$ denotes a —H or —CH$_3$ radical;
R$^3$ denotes a —H radical or an alkyl radical with 1 to 6 carbon atoms or a

radical where
Y is —O—, —S— or —NH— and R$^4$ denotes an alkyl radical with 1 to 12 carbon atoms;
X denotes

or

Z denotes —O—, —S—, or —NH—;
Ar denotes an aromatic radical with 6 to 30 carbon atoms;
a is at least 1;
w is 0 to 6;
x is 0 or 1;
y is 0 or 1; and
z is 0 or 1.

These propolymers are generally prepared by first reacting an aliphatic diisocyanate with a short chain diol in an aprotic solvent. After all short chain diol is consumed, a polysiloxane diol is added. After the polysiloxane diol is consumed, the reaction mixture is cooled and reacted with 2-hydroxyethyl methacrylate to complete the preparation. Prepalation of a prepolymer is illustrated in the following Example 2.

These silicone-containing prepolymers may be copolymerized with a wide variety of hydrophilic monomers to produce soft hydrogel contact lenses. Hydrophilic monomers suitable for this use include 2-hydroxyethylmethacrylate, N-vinyl pyrrolidone, (meth)acrylamide, N-vinyl-N-methyl acetamide, and other olefinically unsaturated hydrophilic monomers. Further comonomers may also be added to enhance wetting or to modify other properties as is generally known to those skilled in the art.

Another presently preferred hydrogel formulation incorporates silicone-containing vinyl carbonate or vinyl carbamate prepolymers of the general formula:

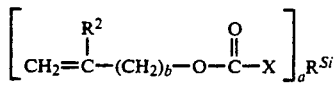

wherein

X denotes an —O—, —S—, or —NR$^3$— divalent radical;
R$^{Si}$ denotes a silicone containing organic radical;
R$^2$ denotes —H or —CH$_3$;
a is 1, 2, 3, or 4; and
b is 0 or 1.

Suitable silicone-containing organic radicals (R$^{Si}$) include the following:

and

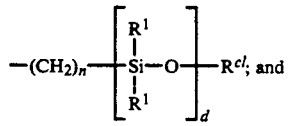

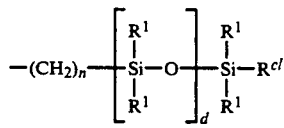

where
R$^1$ denotes a monovalent organic radical such an an alkyl radical with 1 to 6 carbon atoms, or a fluoroalkyl radical with 1 to 6 carbon atoms;
R$^{cl}$ denotes

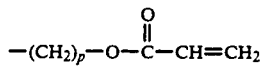

p is 1 or 6; and
d is 1–200, and
where n is 1, 2, 3, or 4, and m is 0, 1, 2, 3, 4, or 5.

The silicone-containing vinyl carbonate/carbamate monomers specifically include 3-[tris(trimethylsiloxy)-silyl]propyl vinyl carbonate; 1,3-bis[4-(vinyloxycarbon-vloxy)but-l-yl]tetramethyl-disiloxane; 3-(trimethylsilyl)propyl vinyl carbonate; t-butyldimethylsiloxyethyl vinyl carbonate; trimethylsilylmethyl vinyl carbonate; trimethylsilylethyl vinyl carbonate; 2,2,2-trifluoroethyl vinyl carbonate; t-butyl vinyl carbonate; 3-[tris(trimethylsiloxy)silyi) propyl vinyl carbonate; 2,2,2-trifluoroethyl vinyl carbamate; 1,1,1,3,3,3-hexafluoro-2-propyl vinyl carbonate; 3-(vinyloxycarbonylthio)propyl-[tris(trimethylsiloxy)silane); 3-[tris-(trimethylsiloxy)silyl]propyl vinyl carbamate; "V$_2$D$_{25}$", 2,2,2-trifluoro-1-phenylethyl vinyl carbonate; 1-adamantane vinyl carbonate, 1-adamantanethyl vinyl carbonate, 1-adamantaneethyl vinyl carbonate; and 1-adamantane vinyl carbamate.

Preferred nonhydrogel soft contact lens formulations are mixtures of polymerizable polysiloxanes containing fluorinated side chains and internal wetting agents. Further components such as toughening agents, crosslinking agents, and other auxiliary modifiers are desirably present as taught in U.S. Pat. No. 4,810,764, the entire content of which is incorporated herein by reference.

Polymerizable, fluorinated polysiloxanes employed in this embodiment of the invention are described by the general formula:

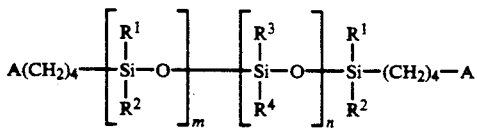

where A denotes an activated unsaturated group, $-R^1$ and $R^2$ independently denote alkyl radicals with 1 to 6 carbon atoms or phenyl radicals; $R^3$ and $R^4$ independently denote alkyl radicals with 1 to 6 carbon atoms, phenyl radicals, or fluorinated alkyl radicals with 1 to 6 carbon atoms, provided that at least one of $R^3$ or $R^4$ is a fluorinated alkyl radical with 1 to 6 carbon atoms; $m+n$ is at least 1; and n is at least 1.

Internal wetting agents ("hydrophilic monomers") useful in this embodiment of the invention include N-alkyenoyl trialkylsilyl aminates (hereinafter NATAII) (described in U.S. Pat. No. 4,652,622) represented by the general formula

wherein
E is H or $CH_3$,
G is $(CH_2)_xC(O)OSi(R)_3$ or H,
R is $CH_3$, $C_2H_5$ or $C_3H_7$,
m is an integer from 1 to 15,
x is an integer from 1 to 10, and
$m+x$ is an integer from 1 to 15

Acryloyl- and methacryloyl-, mono- and dicarboxylic amino acids, hereinafter NAA, impart desirable surface wetting characteristics to polysiloxane polymers, but precipitate out of siloxane monomer mixtures before polymerization is completed. NAA can be modified to form trialkylsilyl esters which are more readily incorporated into polysilocane polymers. The preferred NATA's are
trimethylsilyl-N-methacryloylglutamate,
triethylsilyl-N-methacryloylglutamate,
trimethyl-N-methacryloyl-6-aminohexanoate,
trimethylsilyl-N-methacryloyl-aminododecanoate, and
bis-trimethylsilyl-N-methacryloyl aspartate.

The preferred internal wetting agents are oxazolones of the general formula

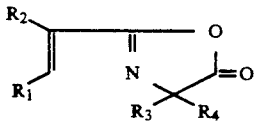

where
$R_1$ and $R_2$ independently denote H or $CH_3$; and
$R_3$ and $R_4$ independently denote methyl or cyclohexylradicals.

These preferred internal wetting agents specifically include 2-isopropenyl-4,4-dimethyl-2-oxazolin-5-one (IPDMO), 2-vinyl-4,4-dimethyl-2-oxazolin-5-one (VDMO), cyclohexane spiro-4'-(2'isopropenyl-2'-oxazol-5'-one) (IPCO), cyclohexane-spiro-4'-(2'-vinyl-2'-oxazol-5'-one) (VCO), and 2-(-1-propenyl)-4,4-dimethyl-oxazol-5-one (PDMO).

These preferred internal wetting agents have two important features which make them particularly desirable wetting agents: (1) They are relatively non-polar and are compatible with the hydrophobic monomers (the polysiloxanes and the toughening agents), and (2) They are converted to highly polar amino acids on mild hydrolysis, which impart substantial wetting characteristics. When polymerized in the presence of the other components, a copolymer is formed. These internal wetting agents result through the carbon-carbon double bond with the endcaps of the polysiloxane monomers, and with the toughening agents to form copolymeric materials particularly useful in biomedical devices, especially contact lenses.

These oxazolones are prepared by the general reaction sequence

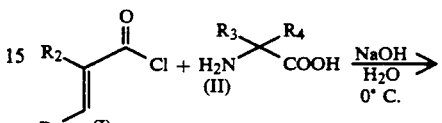

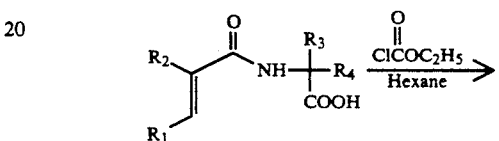

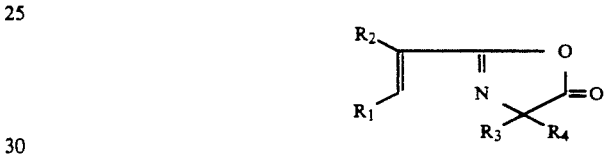

The first step being a Shotten-Bauman acrylation of an amino acid. Upon completion of this step the polymerizable functionality is introduced by using either acryloyl or methacryloyl chloride. Rigid gas permeable contact lens formulations which are suitable for the practice of this invention are silicone-based copolymers prepared from siloxanylalkyl esters of methacrylic acid and other acrylate, methacrylate, or itaconate monomers in many known formulations. See U.S. Pat. Nos. 4,424,328; 4,463,149; 4,664,479; and 4,686,267.

The molding resin used in this invention is a copolymer of an alpha, beta olefinically unsaturated mononitrile and at least one comonomer to enhance melt processability. The resin must be stable in the presence of the unpolymerized contact lens formulation. The softening temperature is preferably at least 30° C., more preferably at least 50° C. to assure compatibility with cure conditions and to assure mold stability. Although the mold formed from the resin may be opaque, the ultraviolet transmission is preferably at least 10% to facilitate efficient ultraviolet curing of the contact lens material.

Homopolymers of alpha, beta olefinically unsaturated mononitriles have limited application in melt processing (required for production of molds) because of high melting point, poor thermal stability, and high melt viscosity. A wide variety of monomers which may be copolymerized with the mononitrile to produce resins useful for melt processing are well known in the art.

Suitable comonomers to copolymerize with the alpha, beta olefinically unsaturated mononitriles include styrenic monomers, benzofuran, esters of (meth)acrylic acid, and vinylic monomers. Examples of suitable styrenic monomers are styrene, alpha-methyl styrene, para-methyl styrene, para-t-butyl styrene, para-t-butyl monochloro styrene, and para-t-butyl dichloro styrene. Examples of suitable esters of (meth)acrylic acid are methyl acrylate, methyl methacrylate, and 2-dimethylaminoethyl methacrylate. Examples of Suitable vinylic monomers are vinyl acetate, 4-vinylpyridine, and vinylidene chloride. More detailed descriptions of these copolymers, their preparation, and their properties may be found in Peng, F., "Acrylonitrile Polymers," *Encyclopedia of Polymer Science and Engineering*, 2d Ed., Vol. 1, pp. 426–470 (John Wiley & Sons, N.Y., N.Y.)(1985).

The comonomers may be modified with an elastomer, desirably a copolymer of a conjugated diene and an alpha, beta olefinically unsaturated mononitrile. Particularly preferred dienes are butadiene and isoprene. Other elastomers such as acrylic elastomers, ethylene-propylene rubbers, and urethane elastomers may also be employed. The only requirement of the elastomer is that it be compatible with the mononitrile.

A class of useful elastomer-modified mononitrile copolymers is ABS, the two-phase system resulting when styrene-acrylonitrile grafted rubber is blended with styrene-acrylonitrile copolymers.

The olefinically unsaturated mononitriles useful in the present invention have the structure

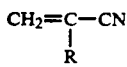

wherein R is hydrogen, a lower alkyl group having from 1 to 4 carbon atoms, or a halogen. Examples include acrylonitrile, alpha-chloroacrylonitrile, alpha-fluoroacrylonitrile, methacrylonitrile, and ethylacrylonitrile.

Preferred resins for use in the method of this invention are prepared by polymerizing an olefinic nitrile (especially acrylonitrile) with an olefinic ester (especially methyl acrylate) in an aqueous medium in the presence of a nitrile rubber. Such resins are described in U.S. Pat. No. 3,426,102 and are available from British Petroleum under the trademark "Barex". Barex resin is a rubber modified copolymer containing 75% acrylonitrile and 25% methyl acrylate.

The surface wettability of a lens on eye is generally accepted to refer to the wettability of the anterior surface of the lens and not the posterior surface which is in contact with the cornea. The posterior surface wettability is not detrimental to the performance of a contact lens as far as wettability is concerned.

The use of mononitrile-based molding materials disclosed in this invention is applicable to all presently known, commercial molding processes, including spin-casting, static cast molding, and spin-casting of anterior surfaces followed by lathe-cutting of posterior surfaces. In processes where only one mold is required to cast lenses, the opacity of the mononitrile-based mold is immaterial to curing. When static cast molding is applied, the mold which lies between the light source used in ultraviolet curing and the monomer mix must be transparent enough to render acceptable curing efficiency. When heat curing is used, the opacity of the mold materials is not a concern as long as the mold is stable at the temperature applied for thermal curing.

Static casting of contact lenses conventionally requires two mold halves. The mold halves may be formed from the same or different materials. The process of this invention requires that at least one of the mold halves will be formed from a mononitrile-based resin. The mold for the anterior surface is preferably formed from a mononitrile-based resin.

While this invention has been described with particular reference to contact lenses, the method of this invention is useful in forming a wide variety of shaped articles used in biomedical applications. Such articles include dialyzer diaphragms, artificial kidneys and other implants (see U.S. Pat. Nos. 2,976,576 and 3,220,960), therapeutic bandages (U.S. Pat. No. 3,428,043), surgical devices such as heart valves, vessel substitutes, intrauterine devices, membranes and other films, catheters, mouth guards, and denture liners (U.S. Pat. Nos. 3,520,949 and 3,618,231), and ophthalmic prostheses (U.S. Pat. No. 3,679,504). Particularly preferred shaped articles for the purposes of this invention are contact lenses and preforms wherein one surface of the lens is formed in the molding process.

CONTACT ANGLE MEASURMENT (SESSILE DROP METHOD)

Contact angles reported in the Examples were determined according to the Sessile Drop Method first developed by Zisman, W. A., et al., *J. Colloid Sci.*, Vol. 1, p. 513 (1946). A plastic film with support was placed on a flat plate in a Rane-Hart goniometer. A drop of liquid of interest (distilled water, buffered saline or any other liquid of interest) was applied to the film through a metered syringe. The angle was read from the viewer, after adjusting the baseline.

GENERAL DESCRIPTION OF LENS MANUFACTURING BY STATIC CAST MOLDING

A monomer mix of defined composition was filtered through a disposable filter of pore size 1.2 u into a clean vial. Through an applicator, 60–90 ul of the mix was injected onto a clean plastic mold (for the anterior surface of a lens) and then covered with another plastic mold (for the posterior surface of the lens) and pressed gently. The molds containing monomer mix were then cured for 2½ hours in the presence of ultraviolet light (4200 microwatts). The molds were opened mechanically and the molds containing lenses were put into a beaker containing an aqueous solution of ethanol or isopropanol. The lenses were released in 20 minutes. They were then extracted with an alcohol over a period of 4 to 48 hours and then boiled with distilled water. After that the lenses were put into distilled water and inspected for cosmetic quality and dimension. Those lenses that passed inspection were thermally disinfected in phosphate-buffered saline before on-eye evaluation.

EXAMPLE 1

Contact Angles of Plastic Resins

The contact angles of plastic plaques from resins most often used in processing hydrogel lenses were measured in distilled (DI) water, buffered saline and mucin solution, using sessile drop method, with the results shown in the following table.

| Resin | Tradename | Source | Contact Angle (°) | | |
|---|---|---|---|---|---|
| | | | DI water | Buffered Saline | Mucin |
| Polyvinylchloride | Geon | Goodrich | 57 | 66 | 45 |
| Polyetherimide | Ultem | GE | 66 | 65 | 49 |
| Polypropylene | Polypro | Himont | 66 | 72 | 54 |

-continued

| Resin | Trade-name | Source | Contact Angle (°) | | |
|---|---|---|---|---|---|
| | | | DI water | Buffered Saline | Mucin |
| Plyarylate | Radel | Amoco | 65 | 67 | 54 |
| Polybutylene terephthalate | Gafite | Celanese | 57 | 56 | 50 |
| Rubber-modified poly(acrylo-nitrile-co-acrylate) | Barex | BP | 44 | 37 | 43 |

Barex resin gave the lowest contact angle in each instance, demonstrating markedly superior wettability in the test environments.

EXAMPLE 2

Preparation of Urethane Prepolymer Derived From Isophorone Diisocyanate, Diethyleneglycol, Polysiloxanediol of Molecular Weight 3000 and 2-Hydroxyethyl Methacrylate A 1 liter, three-neck round bottom flask equipped with reflux condenser and nitrogen inlet unit, was charged with isophorone diisocyanate (17.776 g, 0.08 mole), diethyleneglycol (4.2458 g, 0.04 mole), dibutyltin dilaurate (0.3001 g) and methylene chloride (150 ml.). The content was heated to reflux. After 6 hours, the isocyanate content was checked by titration and was found to have dropped to half of its original amount. Then polysiloxanediol (prepared from reaction of one mole of 1,3-bis(4-hydroxybutyl) tetramethyldisiloxane and 37 moles of dimethoxy dimethyl silane in the presence of acid) of molecular weight 3000 was added (60.002 g or 0.02 mole) and the content remained refluxed for 30 hours. The isocyanate content was rechecked and found to have dropped to a quarter of the original amount. The contents were cooled to ambient temperature and 2-hydroxyethyl methacrylate (2.7301 g, 0.021 mole) was added. After 24 hours, the isocyanate content dropped to none as identified by infrared spectroscopy. The reaction was then suspended and the prepolymer was recovered in quantitative yield after stripping off the solvent.

EXAMPLE 3

Stability of Acrylonitrile-Acrylate Resin Towards Polyurethane Lens Monomer Mix

A lens formulation containing silicone-based urethane prepolymer as shown in Example 2, 35 parts, 3-methacryloxylpropyl tris(trimethysiloxy)silane, 35 parts, N,N-dimethyl acrylamide, 30 parts, butyl carbitol, 40 parts and benzoin methyl ether, 2 parts, was prepared. Two drops of the liquid mix was placed on top of a plastic plaque fabricated from Barex 210 resin, a copolymer containing acrylonitrile and methyl acrylate obtained from British Petroleum. After 16 hours, there was no change of appearance of the plaque surface, indicating the plaque was stable under this test.

Similar tests were run on Ultem resin plaques, molded from a polyetherimide resin from General Electric. It was found that the surface was attacked by the same monomer mix and the plaque surface became rough.

EXAMPLE 4

Contact Angles of Polyurethane Monomer Mix Cast Over Different Plastic Plaques

The formulation of Example 3 was cast over silane-treated glass plates, Barex resin, plaques and polypropylene plaques and cured under UV. After hydration of the films, the contact angles of the films were measured. The contact angles were 52° for glass, 44° for polypropylene, and 35° for Barex resin cast films. The hydrogel films cast out of Barex resin plaques were very wettable by appearance.

EXAMPLE 5

Polyurethane Lens Surface Wettability from Clinical Testing

A formulation prepared as described in Example 3 (except that butyl carbitol was replaced by the same amount of n-hexanol) was cast molded into lenses, using either polypropylene or Barex resin molds. The lenses, after releasing, solvent extraction in ethanol for 16 hours, and hydration, sterilization processes, were subjected to on-eye testings. It was found the lenses cast out of polypropylene were totally non-wetting immediately after putting on eyes, while lenses cast out of Barex resin molds showed good wetting characteristics.

Lenses of the same formulation and fabricated by spincasting in Barex resin molds also showed good wettability on eyes.

EXAMPLE 6

Fluorosilicones Lenses

A monomer mix containing dimethacrylate-capped polysiloxane with fluoroalkyl side chains $M_2D_{35}F_{65}$ as described in U.S. Pat. No. 4,810,764 (98 parts), octafluoropentyl methacrylate (2 parts), 2-vinyl-4,4-dimethyl-2-oxazolin-5-one (5 parts), and benzoin methyl ether (0.2 parts), was cast molded into lenses with polypropylene, Radel (polyacrylate resin from Amoco), Ultem (polyetherimide resin from GE), and Barex molds. After solvent extraction in ethanol for 16 hours, hydration in boiling water for 4 hours, and inspection for cosmetic quality and dimensions, the lenses were put into vials with phosphate buffered saline at pH 7.4 and thermally sterilized. The lenses were then evaluated on-eye. Lenses cast in Barex resin molds showed consistent wettability while lenses cast in other molds were totally non-wetting, or showed serious wettability problems.

EXAMPLE 7

3-[Tris(trimethylsiloxy)silyl]propyl Vinyl Carbamate

To a 200 mL 3-neck round bottom flask fitted with a magnetic stirrer, and dropping funnel was added 5.0 g (14.1 mmol) of 3-amino propyl tris(trimethylsiloxy)silane, 1.23 g (15.6 mmol) of pyridine and 50 mL of chloroform. Five minutes after adding 1.5 g (14.1 mmol) of vinyl chloroformate, an exotherm resulted. The reaction mixture was checked by gas chromatography after 10 minutes. Results showed the starting amine was consumed. The organic phase was washed once with 100 mL 2N HCl then dried with magnesium sulfate. The solvent was removed on a rotary evaporator to afford 5.8 g of crude brown oil. Following chromatography (silica gel, 50% heptane 40% methylenechloride), 5.0 g (11.8 mmol, 83.3%) of colorless oil (bp 130° C., .8 Torr)

was obtained. FTIR (net, capillary) and NMR confirmed the structure

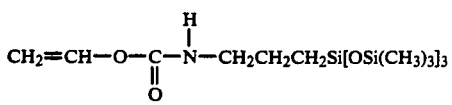

EXAMPLE 8

1,3-Bis[4-(vinyloxycarbonyloxy)but-1-yl]-tetramethyl disiloxane

To a 500 mL 3-neck round bottom flask fitted with a magnetic stirrer, condenser, N2 blanket, dropping funnel, and thermometer, was added 10.0 g (35.9 mmol) of 1,3-bis (4-hydroxybutyl) tetramethylsiloxane, 6.24 g (78.9 mmol) of pyridine and 100 mL of chloroform. Next, 7.64 g (71.8 mmol) of vinyl chloroformate was added to the mixture dropwise producing an exotherm to 54° C. The reaction mixture was cooled to room temperature and stirred for 19 hours. The organic phase was washed twice with 100 ML 2N HCl twice with 100 mL 2N NaOH, then dried over magnesium sulfate. The solvent was removed on a rotary evaporator and the resulting oil was chromatographed (silica gel, chloroform) to give 13.22 g (31.6 mmol, 88.1%) of a light yellow oil. FTIR and NMR confirmed the structure

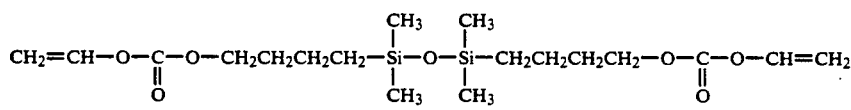

EXAMPLE 9

Preparation of "V2D25"

To a 100 mL 1-neck round bottom microwave flask fitted with a magnetic stirrer and a drying tube was added 5.0 g (11.95 mmol) of the tetramethyldisiloxane prepared from Example 8 and 22.15 g (74.7 mmol) of octamethylcyclotetrasiloxane. Then 0.679 g (0.452 mmol) of trifluoromethanesulfonic acid was added to the reaction mixture. The reddish reaction mixture was stirred for 24 hours, then 0.38 g (4.52 mmol) of sodium bicarbonate was added which resulted in foaming. After 24 hours a small amount of black solid formed. The reaction mixture was filtered through 20.0 g of activated F20 alumina to give a light yellow oil. The oil was heated at 80° C. at .25 Torr for 3½ hours to remove volatiles, giving 13.4 g (5.90 mmol, 49.4%) of a light yellow oil. FTIR and NMR confirmed the structure

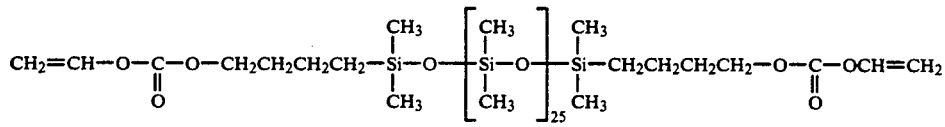

EXAMPLE 10

Polyvinyl Carbamate Lenses

A monomer mix containing 55 parts of the monomer prepared in Example 7, 15 parts of the $V_2D_{25}$ crosslinker prepared as described in Example 9, 30 part N-vinyl pyrrolidone, 15 parts nonanol, and 0.3 parts Darocure-1173 UV initiator was cast molded into contact lenses using Barex resin, Ultem resin, and polypropylene molds. The lenses were released from the molds (satisfactory release could not be obtained from the Ultem resin molds) and then treated to remove extractibles (extracted for 48 hours with isopropanol and then with water). After sterilization, the lenses were evaluated on eye. The lenses cast in Barex resin molds had very good wettability whereas the lenses cast in polypropylene had poor wettability.

What is claimed is:

1. An improved shaped article prepared by copolymerizing at least one silicone-containing monomer and at least one hydrophilic monomer in a mold, the improvement wherein said mold is produced from a resin comprising a copolymer that improves surface wettability of the article polymerized in said mold and which is a copolymer of an alpha, beta olefinically unsaturated mononitrile and at least one comonomer that enhances melt processability of said resin.

2. The shaped article of claim 1 which is a contact lens.

3. The shaped article of claim 2 which is a soft contact lens.

4. The shaped article of claim 2 which is a soft hydrogel contact lens.

5. The shaped article of claim 4, wherein at least one silicone-containing monomer is a prepolymer of the formula:

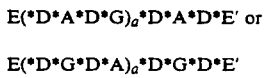

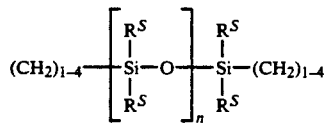

wherein:

A denotes a divalent polymeric radical represented by the formula:

$$(CH_2)_{1-4}\left[\begin{array}{c}R^S\\|\\Si-O\\|\\R^S\end{array}\right]_n\begin{array}{c}R^S\\|\\Si-(CH_2)_{1-4}\\|\\R^S\end{array}$$

wherein $R^S$ denotes an alkyl radical or a short chain fluorinated alkyl radical with 1 to 3 carbon atoms and p provides a moiety weight of 400 to 10,000;

D denotes an alkyl diradical, an alkyl cycloalkyl diradical, a cycloalkyl diradical, an alkylaryl diradical or an aryl diradical, with 6 to 30 carbon atoms;

G denotes an alkyl diradical, a cycloalkyl diradical, an alkyl cycloalkyl diradical, an aromatic diradical or an alkylaromatic diradical with 1 to 40 carbon atoms which may have ether, thio or amine linkages in the main chain;

* denotes a urethane or ureido linkage; and

E and E' denotes polymerizable unsaturated organic radicals represented by the formula

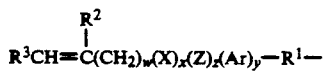

wherein R¹ denotes a divalent alkylene radical with 1 to 10 carbon atoms;

R² denotes H or CH₃;

R³ denotes H, an alkyl radical with 1 to 6 carbon atoms or a

radical where Y is —O—, —S— or —NH—;

R⁴ denotes an alkyl radical with 1 to 12 carbon atoms;

X denotes

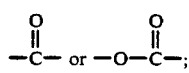

Z denotes —O—, —S' or —NH—;

Ar denotes an aromatic radical with 6 to 30 carbon atoms;

a is at least 1;

w is 0 to 6;

x is 0 or 1;

y is 0 or 1; and z is 0 or 1.

6. The shaped article of claim 5, wherein at least one hydrophilic monomer is selected from the group consisting of 2-hydroethylmethacrylate, N-vinyl pyrrolidone, (meth)acrylamide and vinyl acetamide.

7. The shaped article of claim 4, wherein at least one silicone-containing monomer is a prepolymer of the formula

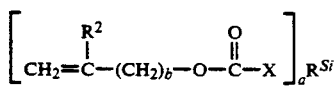

wherein:

X denotes —O—, —S— or —NH—;

R^Si denotes a silicon-containing organic radical;

R² denotes H or CH₃;

a is 1, 2, 3 or 4; and b is 0 or 1.

8. The shaped article of claim 7, wherein the silicon-containing organic radical R^Si is selected from the group consisting of:

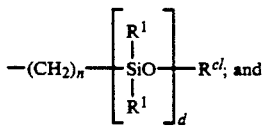

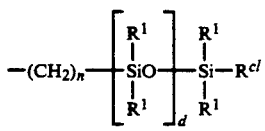

wherein:

R¹ denotes an alkyl radical or a fluoroalkyl radical with 1 to 6 carbon atoms;

R^cl denotes

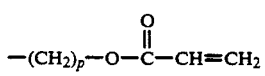

wherein p is 1 to 6;

d is 1-200;

n is 1, 2, 3 or 4; and m is 0, 1, 2, 3, 4 or 5.

9. The shaped article of claim 7, wherein at least one hydrophilic monomer is selected from the group consisting of N-vinylpyrrolidone, N-vinyl-N-methyl acetamide and vinyl acetate.

10. The shaped article of claim 2 wherein is a soft nonhydrogel contact lens.

11. The shaped article of claim 10, wherein at least one silicone-containing monomer is a polymerizable, fluorinated polysiloxane of the formula:

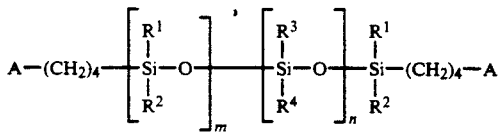

wherein:

A denotes an activated unsaturated group;

R¹ and R² independently denote alkyl radicals with 1 to 6 carbon atoms or phenyl radicals;

R³ and R⁴ independently denote alkyl radicals with 1 to 6 carbon atoms, phenyl radicals, or fluorinated alkyl radicals with 1 to 6 carbon atoms, provided that at least one of R³ or R⁴ is a fluorinated alkyl radical with 1 to 6 carbon atoms;

m+n is at least 1; and n is at least 1.

12. The shaped article of claim 11, wherein at least one hydrophilic monomer is an oxazolone of the formula:

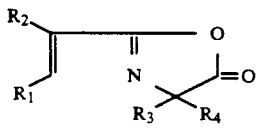

wherein:

R¹ and R² independently denote H or CH₃; and

R³ and R⁴ independently denote CH₃ or cyclohexyl radicals.

13. The shaped article of claim 12, wherein the oxazolone is selected from the group consisting of 2-isopropenyl-4,4-dimethyl-2-oxazolin-5-one (IPDMO), 2-vinyl-4,4-dimethyl-2-oxazolin-5-one (VDMO), cyclohexane spiro-4'-(2'-isopropenyl-2'-oxazol-5'-one) (IPCO), cyclohexane-spiro-4'-(2'-vinyl-2'-oxazol-5'-one) (VCO) and 2-(1-propenyl)-4,4-dimethyl-oxazol-5-one (PDMO).

14. The shaped article of claim 2, wherein the contact lens is a rigid gas permeable lens.

15. The shaped article of claim 2, wherein the olefinically unsaturated mononitrile is of the formula:

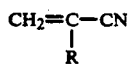

wherein R is hydrogen, a lower alkyl group having 1 to 4 carbon atoms or halogen.

16. The shaped article of claim 15, wherein the olefinically unsaturated mononitrile is acrylnitrile.

17. The shaped article of claim 2, wherein the olefinically unsaturated mononitrile is copolymerized with an ester of (meth)acrylic acid.

18. The shaped article of claim 17, wherein the olefinically unsaturated mononitrile is copolymerized with the ester in the presence of a nitrile rubber.

19. In a silicone-containing contact lens prepared by copolymerizing at least one hydrophobic silicon-containing monomer and at least one hydrophilic monomer in a mold, the improvement wherein a surface of the contact lens is formed from a molding surface of the mold and the mold is provided from a resin comprising a copolymer that improves surface wettability of the contact lens polymerized in said mold and which is a copolymer of an alpha, beta olefinically unsaturated mononitrile and at least one comonomer that enhances melt processability of said resin.

* * * * *

UNITED STATES PATENT AND TRADEMARK OFFICE
CERTIFICATE OF CORRECTION

PATENT NO. : 5,274,008                    Page 1 of 4
DATED : December 28, 1993
INVENTOR(S) : Yu-Ching Lai It is certified that error appears in the above-indentified patent and that said Letters Patent is hereby corrected as shown below:

In column 2, delete lines 24-27 in their entirety and insert the following:

-- filed June 7, 1989 now U.S. Pat. No. 5,034,461 (issued July 23, 1991) and 07/346,204 filed May 2, 1989 now U.S. Pat. No. 5,070,215 (issued December 3, 1991), the entire contents of --

In column 2, lines 53-54 change "and provides" to -- and p provides --.

In column 4, line 29, change "an an" to -- as an --.

In column 4, line 38, change "1 or 6" to -- 1 to 6 --.

In column 4, line 44, change "(vinyloxycarbon-vloxy)" to -- (vinylcarbon-yloxy) --.

In column 4, line 49, change "silyi)" to -- silyl] --.

In column 4, line 54, change "lane);" to -- lane]; --.

In column 5, line 18, change "(hereinafter NATAN)" to -- (hereinafter "NATA") --.

In column 6, line 47, change "C." to -- C --.

UNITED STATES PATENT AND TRADEMARK OFFICE
CERTIFICATE OF CORRECTION

PATENT NO. : 5,274,008
DATED : December 28, 1993
INVENTOR(S) : Yu-Chin Lai

It is certified that error appears in the above-indentified patent and that said Letters Patent is hereby corrected as shown below:

In column 6, line 48, change "C." to -- C --.

In column 7, line 2, change "Suitable" to -- suitable --.

In column 7, line 36, change "nitrite" to -- nitrile --.

In column 9, line 6, change "Plyarylate" to -- Polyarylate --.

In column 10, line 7, change "resin," to -- resin --.

In column 10, line 42, change "Barex molds." to -- Barex resin molds. --.

In column 11, line 11, change "(vinyloxvcarbonyloxv)" to -- (vinyloxycarbonyloxy) --.

In column 11, line 65, change "30 part" to -- 30 parts --.

UNITED STATES PATENT AND TRADEMARK OFFICE
CERTIFICATE OF CORRECTION

PATENT NO. :
DATED :
INVENTOR(S) :

It is certified that error appears in the above-indentified patent and that said Letters Patent is hereby corrected as shown below:

In column 12, line 47, change

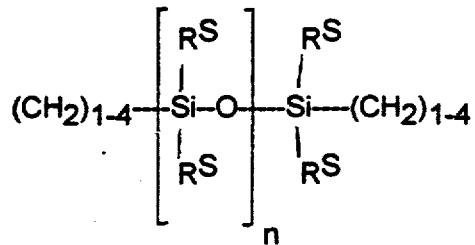

to --

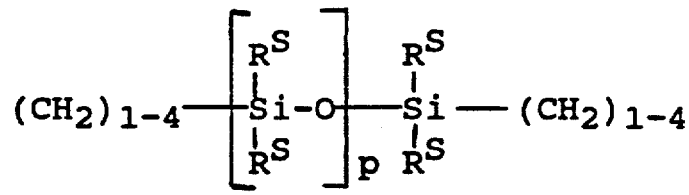

UNITED STATES PATENT AND TRADEMARK OFFICE
CERTIFICATE OF CORRECTION

PATENT NO. : 5,274,008

DATED : December 28, 1993

INVENTOR(S) : Yu-Chin Lai

It is certified that error appears in the above-indentified patent and that said Letters Patent is hereby corrected as shown below:

In column 13, line 56, change "silicon-containing" to -- silicone-containing --.

In column 13, line 60, change "silicon-" to -- silicone- --.

In column 13, line 31, change "-S'" to -- -S- --.

In column 13, line 42, change "2-hydroethylmethacrylate," to -- 2-hydroxyethylmethacryate --.

In column 14, line 32, change "wherein" to -- which --.

In column 16, line 2, change "acrylnitrile" to -- acrylonitrile --.

In column 16, line 10, change "silicon-con-" to -- silicone-con- --.

In column 16, line 14, change "provided" to -- produced --.

Signed and Sealed this

Twentieth Day of September, 1994

Attest:

BRUCE LEHMAN

*Attesting Officer*   *Commissioner of Patents and Trademarks*